United States Patent [19]
Best et al.

[11] Patent Number: 5,459,853
[45] Date of Patent: Oct. 17, 1995

[54] EFFICIENT VARIABLE-BLOCK DATA STORAGE SYSTEM EMPLOYING A STAGGERED FIXED-BLOCK-ARCHITECTURE ARRAY

[75] Inventors: John S. Best, San Jose; Steven R. Hetzler, Sunnyvale; Roger F. Hoyt, San Jose; Jaishankar M. Menon; Michael F. Mitoma, both of San Jose, all of Calif.

[73] Assignee: International Business Machines Corporation, Armonk, N.Y.

[21] Appl. No.: 979,740

[22] Filed: Nov. 23, 1992

[51] Int. Cl.$^6$ .......................... G06F 12/00; G06F 12/04
[52] U.S. Cl. .......................... 395/441; 395/438; 395/439; 364/266.3; 364/931.48; 364/957.1; 364/966.3; 364/DIG. 1; 364/DIG. 2; 371/51.1
[58] Field of Search ........................ 395/425, 438, 395/439, 441; 364/200 MS File, 900 MS File; 371/2.1, 2.2, 38.1, 39.1, 40.1, 40.4, 51.1

[56] References Cited

U.S. PATENT DOCUMENTS

| | | | |
|---|---|---|---|
| 5,072,378 | 12/1991 | Manka | 395/575 |
| 5,206,939 | 4/1993 | Yanai et al. | 395/400 |
| 5,263,145 | 11/1993 | Brady et al. | 395/425 |
| 5,271,012 | 12/1993 | Blaum et al. | 371/101 |
| 5,271,014 | 12/1993 | Bruck et al. | 371/11.1 |
| 5,301,297 | 4/1994 | Menon et al. | 395/425 |
| 5,301,304 | 4/1994 | Menon | 395/500 |
| 5,351,246 | 9/1994 | Blaum et al. | 371/10.1 |

OTHER PUBLICATIONS

"Data Storage" by R. A. Aziz; IBM Technical Disclosure Bulletin; vol. 20, No. 7, Dec. 1977; pp. 2581–2583.
"Skewed Format Method For Personal Computer Hard Disks To Reduce Rotational Latency Delays", L. Levy; IBM TDB; vol. 29, No. 4, Sep. 1986.

"A Case for Redundant Arrays of Inexpensive Disks (RAID)" by D. A. Patterson et al; ACM SIGMOD Conference, Jun. 1988; pp. 109–116.

*Primary Examiner*—Eddie P. Chan
*Assistant Examiner*—Frank J. Asta
*Attorney, Agent, or Firm*—Baker, Maxham, Jester & Meador

[57] ABSTRACT

A method for operating a synchronized array of fixed block (FBA) formatted Direct Access Storage Devices (DASDs) to store and update variable-length (CKD) formatted records. This method is suitable for use with DASDs that obtain high recording density by using read and write head technology requiring "micro-jogging" to adjust for differing read and write head alignment or banded disk architecture having a higher block count in the outer tracks than in the inner tracks. Magneto-resistive heads may require micro-jogging to realign the write head for recording after reading the physical track location. The invention employs a DASD staggered array architecture having logical tracks consisting of diagonal-major sequences of consecutive blocks arranged in a predetermined wrap-around manner such as a topological cylinder or torus. The minimum necessary number of DASDs (N) in the staggered array is limited by the fixed block size (B), the interblock gap size (G), the average DASD data transfer rate (D), and the micro-jog delay time (T). A $(N+1)^{th}$ DASD may be added to record the parity of each diagonal-major sequence for improved fault-tolerance.

29 Claims, 6 Drawing Sheets

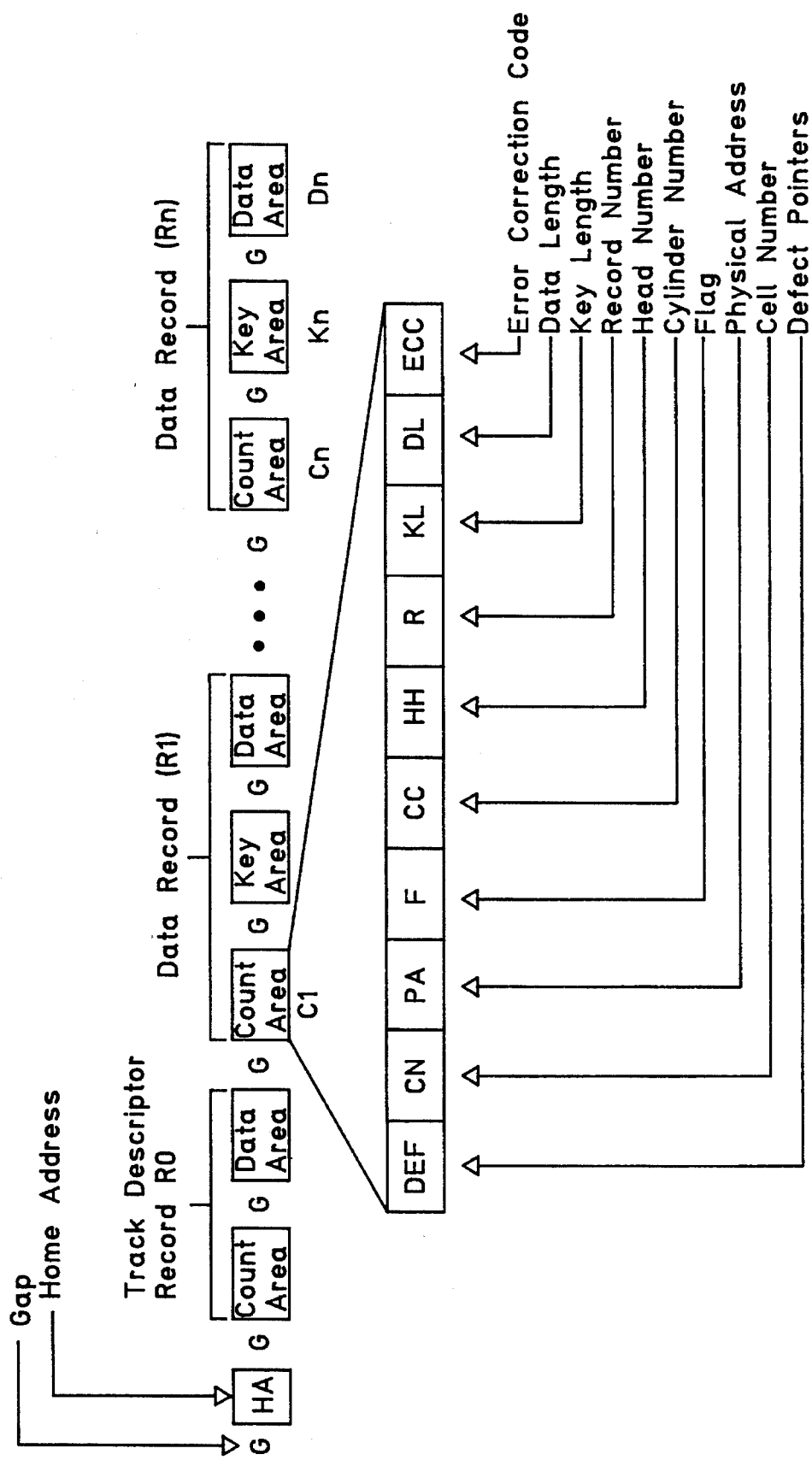
FIG. 2 CKD Track Format (Prior Art)

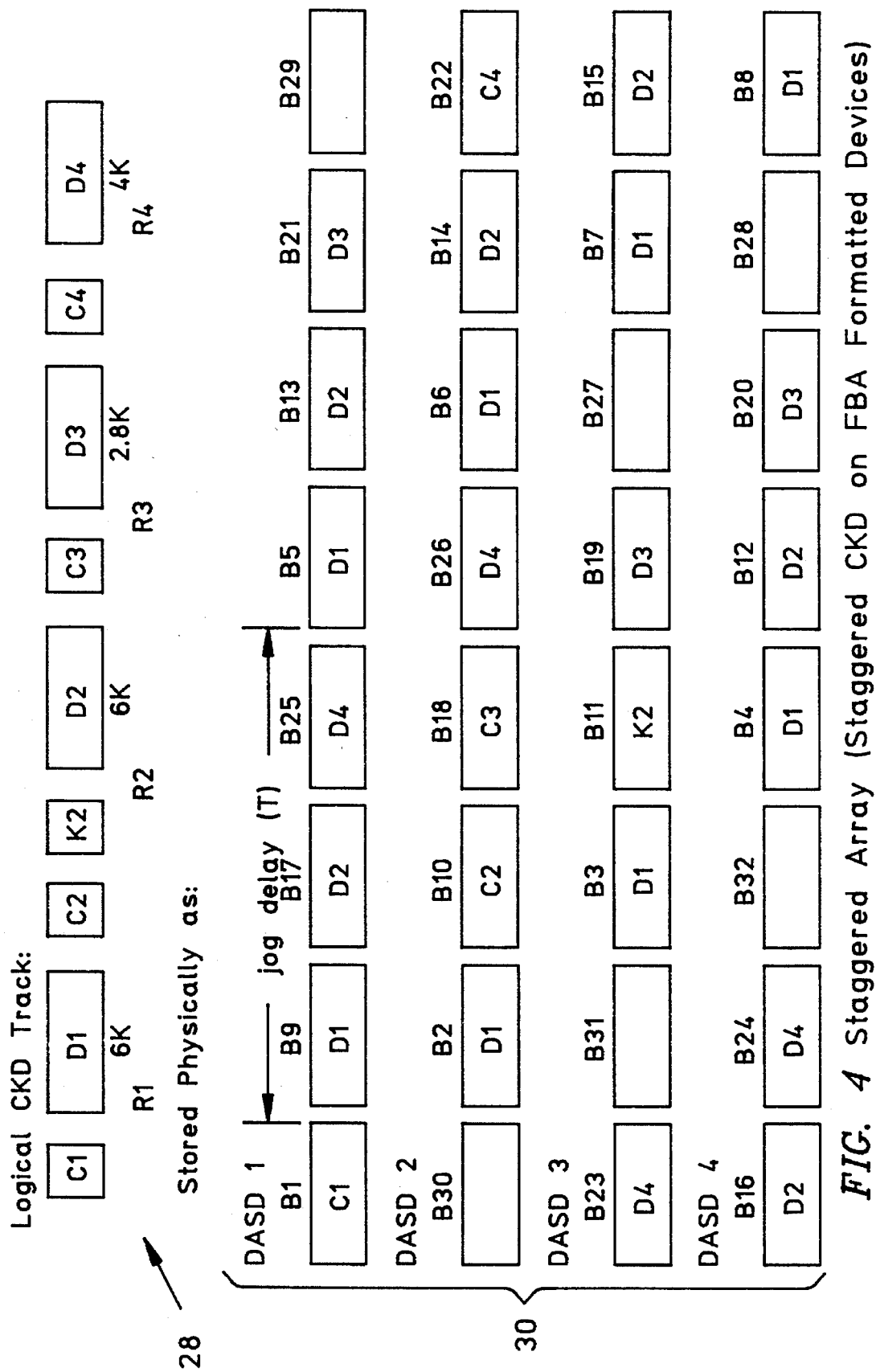
FIG. 4 Staggered Array (Staggered CKD on FBA Formatted Devices)

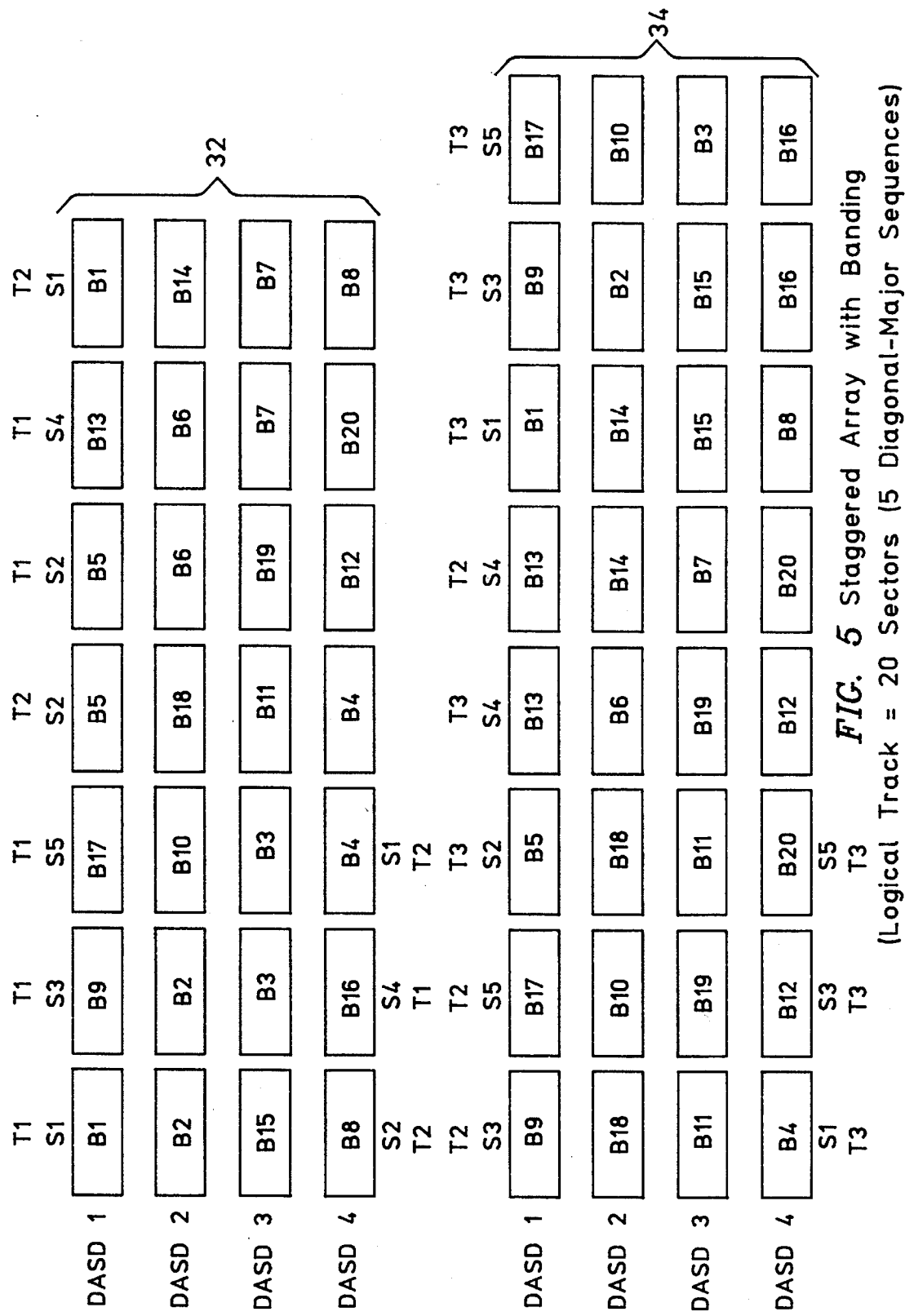
FIG. 5 Staggered Array with Banding (Logical Track = 20 Sectors (5 Diagonal-Major Sequences)

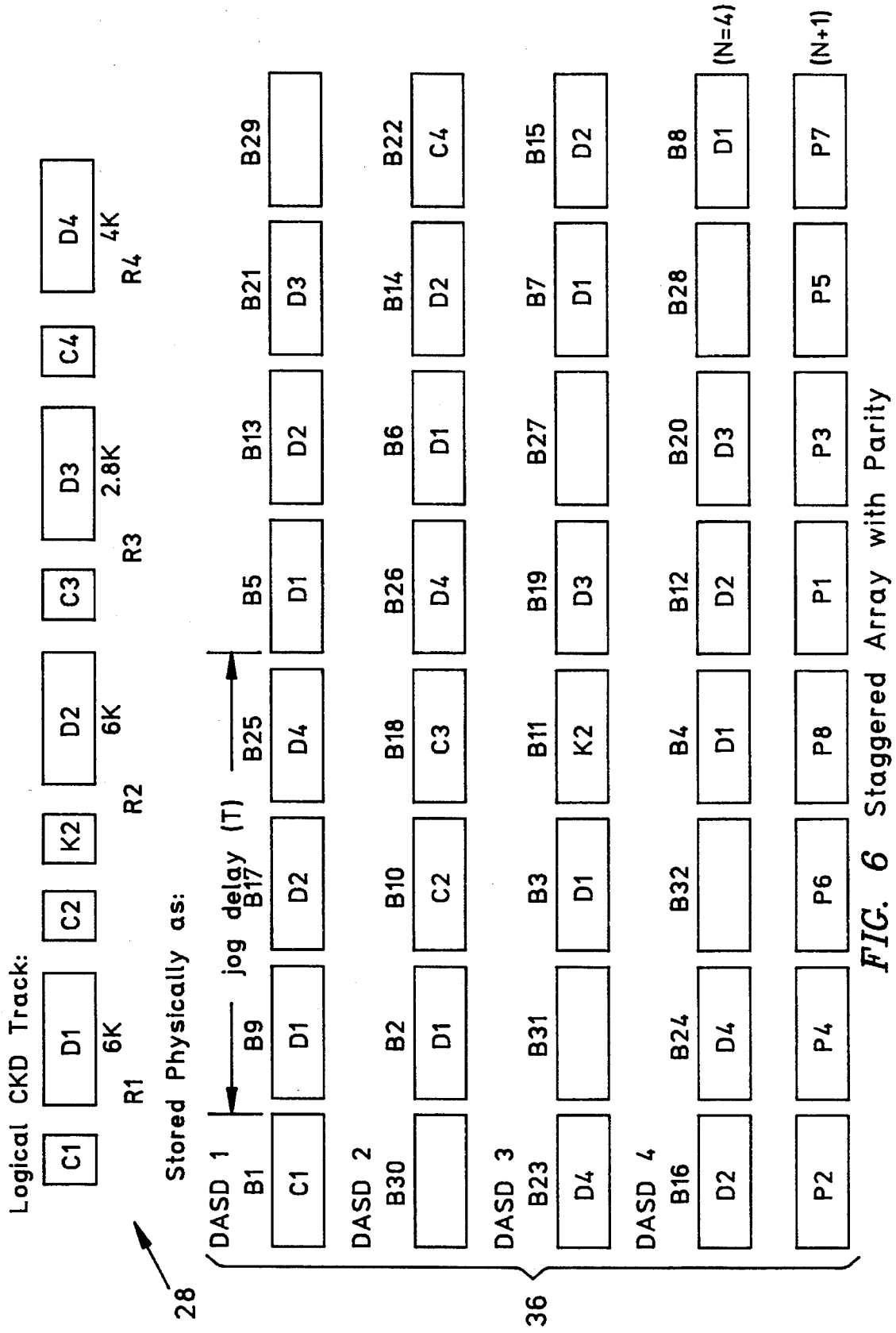

EFFICIENT VARIABLE-BLOCK DATA STORAGE SYSTEM EMPLOYING A STAGGERED FIXED-BLOCK-ARCHITECTURE ARRAY

BACKGROUND OF THE INVENTION

1. Field of the Invention

This invention relates to a Direct Access Storage Device (DASD) architecture for Count-Key-Data (CKD) records and, more specifically, to a CKD DASD system that uses Fixed-Block Architecture (FBA) records on an array of DASDs employing banding and separate read and write heads.

2. Description of the Related Art

Fixed-Block Architecture (FBA) is a common configuration used to format disk files. In a FBA formatted disk file, each concentric disk track is divided into a number of equal-sized sectors and each sector contains fixed-length blocks each having servo information, identification information (ID), and data. It is possible to eliminate the ID fields from FBA formatted devices by using the NO-ID technique described by Hetzler and Best in the copending patent application, "Sector Architecture For Fixed Block Disk File", filed on Jul. 10, 1991 as Ser. No. 07/727,680 and continued in application Ser. No. 08/082,826 filed on Jun. 23, 1993, and incorporated herein by this reference.

The IBM Count-Key-Data (CKD) architecture is a variable-length record configuration that is well-known in the art. The high-end IBM systems use CKD format with the MVS operating system. Each CKD record includes a fixed-length count field, an optional key field and a variable-length data field. The count field defines the length of the data field and the optional key field serves to identify the record. Each of the fields are distributed along a Direct Access Storage Device (DASD) track and are separated by gaps of predetermined fixed size. This gap, as it rotates under a read or write head at a constant speed, defines a time interval during which the system prepares to handle the next field.

Practitioners in the data storage arts have proposed numerous techniques for increasing DASD storage density and access efficiency. As DASD storage capacities increase, reliability continues to be an important consideration in the data storage arts. Moreover, as track spacing is reduced, read and write head alignment tolerances must be tightened considerably.

In the newer high-capacity DASDs, track widths are narrow and magneto-resistive heads may be used. Because there may be relatively significant offset between magneto-resistive read and write head centerlines arising from misalignment and head skew, provision is made for "micro-jogging" the common head actuator when switching from a read operation to a write operation. This actuator micro-jogging permits head realignment to compensate for centerline offset when switching from read to write after locating a target sector.

The micro-jogging operation can be understood as a small fractional-track adjustment to the radial location of the actuator assembly that is made when switching from a "read" operation to a "write" operation or back again. When reading, the actuator assembly is aligned so that the read head is precisely aligned with the center of the data track recorded on the rotating disk surface. When writing, the actuator assembly is moved slightly in a direction that aligns the write head centerline with the track. If a single head is used, micro-jogging may be necessary because of variation in the "effective" head centerline between read and write operations. The precise amount of this "micro-jog" depends on the head characteristics, the servo track characteristics, and other physical factors. Micro-jogging is typically accomplished by commands from the DASD controller.

In a CKD system, the DASD must first locate a count field (read) and then update the following data field (write). In newer high-density devices having magneto-resistive heads, the head actuator must be micro-jogged after the count field is read and before the data field is written. In a typical DASD, there is a gap of about 70 microseconds between the end of the count field and the beginning of a subsequent data field. Perhaps 300 to 500 microseconds are needed to perform such a microjog, which is many times longer than the inter-field gap delay. Thus, with such devices, either the inter-field gap delay must be increased by several-fold or a disk revolution is lost to provide for the necessary micro-jog time delay. The former option is very wasteful of disk capacity and the latter is very wasteful of disk access time and data transfer rate.

Newer DASDs also may be formatted in "bands" to exploit the increased linear capacity of tracks located at the larger radii. That is, the disk surface may be divided into a number of concentric "bands", each having a number of tracks formatted with a single physical track capacity. The track capacity in an interior band is less than the track capacity in an outer band for a given linear track data density. Thus, track capacity in a single disk could vary by several hundred percent without changing linear track density. Banded devices cannot be used with data formats that require a fixed track capacity unless provided with special operating system modifications.

R. A. Aziz ("Data Storage", IBM Technical Disclosure Bulletin, Vol. 20, No. 7, December 1977, pp. 2581–2583) proposes a banded spiral tracking format for increasing the storage disk recording capacity in a DASD. Aziz teaches the use of a single spiral segment within each concentric band that is entirely rewritten when updated but which may be repeatedly read in whole or part. Aziz asserts that his spiral technique doubles the data storage capacity of each disk compared to the nonbanded concentric tracking technique known in the art. However, his spiral track is impractical to edit and must be entirely overwritten when updated.

Practitioners have proposed a number of useful solutions to the continuing reliability problem in the data storage arts. As DASD storage capacity increases, so do the system-wide effects of single DASD failures. Generally, a DASD failure will shut down the entire system unless online backup data storage is provided. One elegant solution for this problem is known in the art as the Redundant Array of Inexpensive Disks (RAID) architecture described by David A. Patterson et al ("A Case for Redundant Arrays of Inexpensive Disks (RAID)"), ACM SIGMOD Conference, June 1988, pp. 109–116.

The data storage art is replete with techniques for emulating variable-length (e.g., CKD format) storage, while using FBA formatted DASDs. FBA DASDs are made more efficient the "NO-ID" technique disclosed in the above-cited Hetzler and Best patent application. CKD emulation is typically executed in a DASD control unit to make a FBA disk appear as a CKD disk to the host operating system. The introduction of RAID storage systems with parity has given rise to a clearly-felt need for CKD emulation methods for use in FBA formatted DASD arrays.

In U.S. Pat. No. 5,072,378, Paul S. Manka discloses a

DASD RAID system with independently stored parity that is suitable for fault-tolerant storage of variable-length CKD records. Manka teaches the use of a separate DASD for storing parity blocks so that if one DASD fails or otherwise becomes unavailable, the affected record segments can be reconstructed by combining the remaining record segments with the parity blocks. Manka's system increases storage efficiency and accommodates variable-length data records without operating system modification by employing a virtual track imaging technique that interleaves logical sectors in physical track locations.

Menon discloses a system for accessing variable-length records stored on a synchronous array of FBA formatted DASDs in copending patent application "Method And Means For Execution of Commands Accessing Variable Length Records Stored On Fixed Block Formatted DASDs of an N+2 DASD Synchronous Array", filed on Apr. 2, 1991 as patent application Ser. No. 07/679,455 and appealed to the USPTO Board of Patent Interferences and Appeals on May 31, 1994, and entirely incorporated herein by this reference. Menon teaches a system for partitioning each variable-length CKD record into a variable number of equal fixed-length FBA blocks and synchronously writing the blocks in column-major order onto a DASD array. His column-major order is constrained so that the first block of each CKD record (the count field) is written at a one-column offset on the $(N+1)^{st}$ DASD of the (N+2) DASD array. The last $(N+2)^{nd}$ DASD is reserved for recording parity blocks to give fault-tolerance in a manner similar to that known in the art. However, Menon's system loses disk revolutions in situations where the head actuator must be micro-jogged when switching from read to write operations or back again. That is, the delay required to switch from read alignment to write alignment causes his system to miss the target field during the first disk revolution, requiring the system to wait until the target block again passes under the write head during a subsequent revolution. Also, Menon neither teaches nor suggests means for accommodating the variable track capacity introduced by the banded disk formats known in the art.

The above-cited Hetzler and Best patent application teaches a partial solution to the micro-jogging problem. Because no separate ID region is incorporated in the block header, the read-write recovery gap is eliminated along with the intra-block read-to-write transition for a FBA formatted disk. With earlier fixed block architectures, writing a data field requires prior reading of the ID field. Because it is not possible to complete a micro-jog between the ID and data fields, a disk revolution must be lost during the intra-block micro-jog. The NO-ID format disclosed by Hetzler and Best in the above-cited application eliminates this intrablock read-write transition. However, as noted above, Hetzler and Best discuss only FBA formats and neither consider nor suggest a method for handling variable length records such as the CKD format known in the art.

L. Levy ("Skewed Format Method For Personal Computer Hard Disks To Reduce Rotational Latency Delays", IBM Technical Disclosure Bulletin, Vol. 29, No. 4, September 1986, pp. 1867–8) suggests a skewed sector format to reduce rotational latency delays (lost revolutions) such as those introduced by inter-track seek operations or micro-jogging operations. Levy suggests offsetting sectors on adjacent concentric tracks by a predetermined angle . Levy's intent is to allow for cylinder-to-cylinder stepping time by introducing a passive rotational latency between tracks. However, Levy neither discloses nor suggests any useful technique for introducing rotational latency in RAID systems involving synchronous disk arrays where each logical record is spread over many DASDs's.

No efficient CKD-emulation technique is known in the art for arrays of FBA-formatted banded DASDs having different read and write head alignments. The related unresolved problems and deficiencies are clearly felt in the art and are solved by this invention in the manner described below.

SUMMARY OF THE INVENTION

The method of this invention accommodates arrays of DASDs having either banded formats or micro-jogging delays or both through the use of a novel staggered DASD array architecture. The staggered array is organized as a series of logical tracks containing consecutive fields ordered across a FBA-formatted DASD array in a predetermined wrap-around pattern. Each of the DASDs in the staggered array is formatted as a FBA device without ID fields using the NO-ID technique disclosed in the above-cited Hetzler and Best patent application. The minimum number of DASDs required in the array depends on the disk block size (B), the inter-block gap size (G), the disk data transfer rate (D) and the micro-jog time delay (T).

It is an object of this invention to organize variable-length CKD records along logical tracks such that any CKD record can be read sequentially by reading consecutive block numbers along a diagonal-major pattern across the DASD array. It is a feature of this invention that only one of the DASDs in the array is transferring data at a time.

It is another object of this invention to separate the fields in the variable-length CKD records by a number of FBA blocks sufficient to allow time for micro-jogging after reading the physical location of a target CKD record before writing the updated CKD record. It is an advantage of this invention that sufficient micro-jogging time is provided without losing a disk revolution between read (locate) and write (update) operations.

It is yet another object of this invention to provide a fixed logical track size containing a fixed number of FBA blocks along a diagonal-major path that is independent of physical track size. It is a feature of this invention that the logical track size is predetermined independently of the variable (or fixed) physical track capacities on a banded DASD.

It is yet another object of this invention to provide staggered array fault-tolerance by including an additional $(N+1)^{th}$ DASD for parity. It is an advantage of this invention that a parity block containing the parity of a corresponding series of diagonal-major data blocks can be written and updated without losing disk rotations.

It is yet another advantage of this invention that it allows a properly designed FBA formatted DASD array to be used for either FBA or CKD formatted data storage merely by changing the DASD controller microcode.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIG. 2 is a schematic description of the Count-Key-Data (CKD) record format;

FIG. 4 shows the diagonal-major format or this invention for recording a logical CKD track on a staggered array of FBA formatted DASDs;

FIG. 5 illustrates the application of the format of FIG. 4 in a staggered array of banded DASDs;

FIG. 6 illustrates the application of the format of FIG. 4 to a staggered DASD array with provision for storing diagonal parity blocks in a single additional DASD;

DESCRIPTION OF THE PREFERRED EMBODIMENTS

The Synchronous DASD Army

Figure 1:
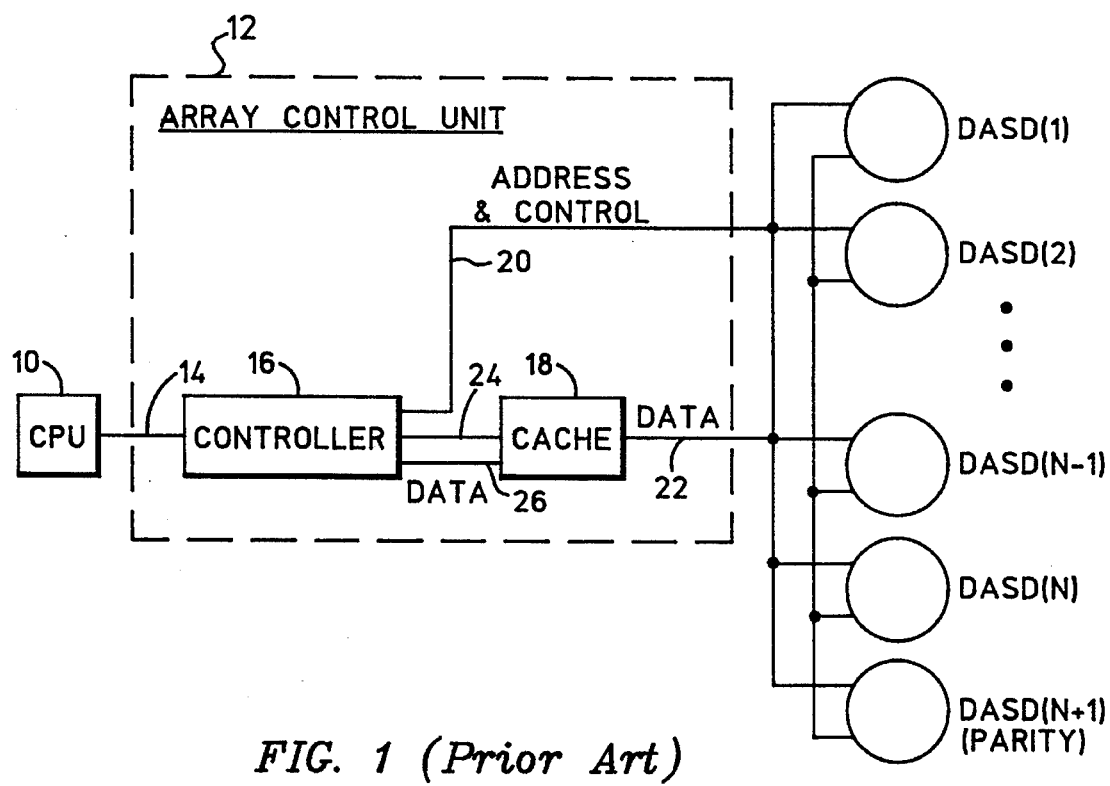
FIG. 1 provides a block diagram of a synchronous DASD array.

FIG. 1 shows a typical data processing and storage system having a peripheral synchronous DASD array. A central processing unit (CPU) 10 accesses a plurality of DASDs (1) through (N+1) over a path 12 that includes a channel 14, an array controller 16 and a cache 18. Controller 16 operates to ensure synchronism and steers the access among DASD (1) through DASD(N+1) over the control path 20. Responsive to an access command from CPU 10, N+1 streams of data defining a predetermined number of consecutive bytes are exchanged in parallel in cache 18 over data path 22. Similarly, data may be exchanged serially, byte-by-byte, between CPU 10 and controller 16 over path 14 following a parallel-to-serial conversion in controller 16 in the read direction and a serial-to-parallel conversion in the write direction.

In the read direction, data is supplied from cache 18 to controller 16 by way of data paths 24 and 26. In the write direction, data is moved from controller 16 to cache 18 over the same paths 24 and 26.

As a physical storage system, an array of N+1 DASDs is defined herein to be any physical arrangement of N+1 DASDs of which some or all can be concurrently accessed. The logical formatting and subsequent read/write accessing of such an array as a physical store proceeds by first copying or inserting data in consecutive positions on either a row or a column basis. If this formatting operation is performed in a column direction it is herein denominated as being performed in a "column-major order". Likewise, if performed in a row direction, is herein denominated as being performed in a "row-major order". After such logical formatting, the logical "array" is then mapped to the physical DASD array. N of the N+1 blocks in a column-major sequence represent data records and the $(N+1)^{st}$ block contains parity information.

FIG. 2 sets forth the characteristics of the variable-length CKD record format, which are well-known in the art. The CKD format is described in detail in the above-cited Menon patent application. A CKD disk format differs from a fixed-block (FBA) disk format in that the CKD format allows for the storage of variable-length records and for the storage of keys separately from data. The single CKD track in FIG. 2 consists of a Home Address (HA) field followed by data records R0 through Rn. Each data record Ri consists of at least one count (Ci) field, one variable-length data (Di) field and optionally one key (Ki) field. All data records and fields are separated by gaps (G) of varying length that depend on changes in data block lengths over time. Each count or HA field contains subfields such as Defect Pointers, Cell Number, Physical Address and so forth. The Cylinder Number, Head Number and Record Number fields are collectively denominated as CCHHR, which is the Logical ID for the record. The CKD record must include this ID field, which may not be eliminated, but the Cylinder and Head Numbers need not be identical to those in the Physical Address field. Thus, the Record Numbers of consecutive records on a physical track need not be consecutive nor need they be unique.

On each physical CKD track, there is one HA field that defines the physical location of the track (track address) and the condition of the physical track. The HA field is initialized at the factory during manufacture. The first record (R0) is often used as a track descripter record and may be used by system software to store information about the physical track. Records R1 through Rn are user records.

Figure 3:
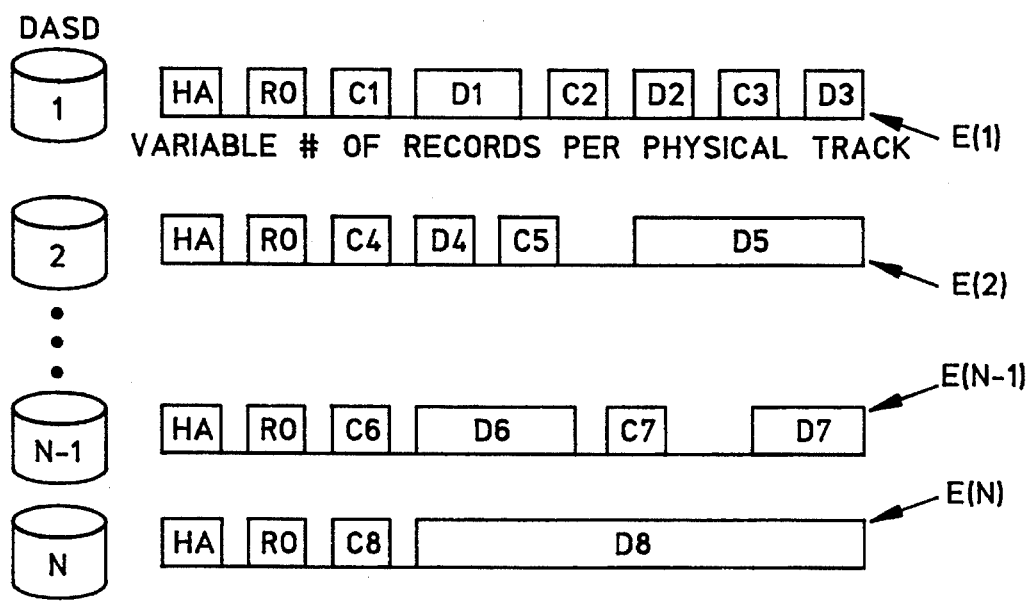
FIG. 3 shows an exemplary RAID CKD format with parity for the DASD array of FIG. 1.

FIG. 3 shows a row-major or track-oriented layout of CKD variable-length records according to a second copending Menon patent application filed on Mar. 8, 1991 as Ser. No. 07/666,289 and issued as U.S. Pat. No. 5,257,362. The example in FIG. 3 is included herein merely to illustrate the typical variable-length CKD data storage architecture available in synchronous DASD arrays in the prior art. Note that each physical track E(1) through E(N) contains a variable number of CKD records and each block within the CKD records is of variable size and spacing. Except for the track header blocks (HA, RO) and the first count block (Ci) on each physical track, the example in FIG. 3 exhibits no columnar symmetry. Herein, a "synchronous" DASD array denominates an array wherein the physical tracks within DASD (1) through DASD (N–1) are all accessed simultaneously on a column-major a single column-major sequence in a predetermined cylinder are simultaneously available on data path 22 (FIG. 1). FIG. 3 does not provide a useful architecture for column-major data storage of CKD records.

CKD Disk Data Transfer Operations

CPU 10 (FIG. 1) requests an I/O operation from a CKD disk (not labelled) by creating and asking for the execution of a channel program. The channel program is jointly executed by a channel (not shown) within CPU 10 and array control unit 12. The simplest form of the channel program can be expressed in pseudocode as:

Define Extent

Locate (Seek Address, Sector position, Read/Write, ID)

Write Data

The Define Extent command establishes the physical track boundaries over which the channel program is permitted to operate. The Locate command calls for the disk access mechanism to be moved to a particular cylinder and then for the disk to prepare to read/write from a particular track fat a particular sector (rotational) position on the cylinder. After determining the read/write head to be at the specified sector on the specified track, the channel compares the ID field of the record on the track next following the sector specified in the Locate command with the ID specification in the Locate command. If these are not identical, the Search is continued to the next ID field. If there is a match and the channel is writing, the Write command is executed, causing an updated field to be transferred from main storage (not shown) to disk. The ID field refers to the CCHHR subfields within the count fields (Ci) on the CKD disk (FIG. 2).

For the above channel program, a count field (Ci) must be read before the following data field can be written. This requires a transition from read to write head alignment (micro-jog) between the count field reading and the start of writing in the subsequent data field. If the micro-jog time delay (T) exceeds the gap (G) between count field (Ci) and data field (Di), the data field (Di) write must wait until the next pass, thereby losing an entire disk revolution. The NO-ID innovation disclosed by Hetzler and Best in the above-cited patent application is applicable only to FBA disks and offers no improvement to this CKD problem unless CKD records are stored on FBA formatted disks.

The Staggered DASD Array Invention

The method of this invention uses an array of DASDs, each of which is formatted as a FBA device without ID fields according to the NO-ID technique disclosed in the above-cited Hetzler and Best patent application. The number N of DASDs in the staggered array depends on the fixed block size (B), the size of the gap between blocks (G), the disk data transfer rate (D) and the micro-jogging delay time (T). The inventors found that accommodation of micro-jogging requires the number of disks N in the array to satisfy the inequality:

$$T \leq \frac{((B+G)(N-1)+G)}{D} \quad \text{[Eqn. 1]}$$

The following discussion explains this requirement. FIG. 4 shows an exemplary CKD track 28 (with the HA and R0 fields omitted) having four records. Record R1 has no key field but has an 8KB data field D1. Record R2 has a key field K2 and a 6KB data field D2. Record R3 has a 2.8KB data field D3. Record R4 has a 4KB data field D4. FIG. 4 also shows a set of physical tracks making up a cylinder 30 from four DASDs, which form a synchronous DASD array with N=4. The four disk actuators (not shown) are synchronized to simultaneously access the same cylinder position and the disks are rotationally synchronized. A single physical track having eight fixed-length (1KB) blocks is shown for each of the four disks. The 32 blocks represent single array cylinder 30. In this example, they also represent one embodiment of the logical track of the method of this invention, where the block numbers B1–B32 in FIG. 4 denominate the diagonal-major block number sequence for the logical track.

The diagonal track organization of blocks B1–B32 exemplifies the staggered array format of this invention. Note that the consecutive block numbers follow a diagonal-major pattern, wrapping around from DASD 4 to DASD 1. This type of pattern is herein denominated a predetermined toroidal traverse consisting of diagonal-major sequences of fixed-length blocks. For example, block B2 on DASD 2 is offset by one block columnar position from block B1 on DASD 1. Similarly, block B5 on DASD 1 is offset by one block columnar position from block B4 on DASD 4. At the wrap-around from DASD 4 to DASD 1, there may be more than a single block columnar offset; e.g., block B9 on DASD 1 is offset by two block columnar positions from block B8 on DASD 4.

It will be appreciated upon examination of FIG. 4 that when the number of blocks per track is relatively prime with respect to the number of DASDs in the array, then the columnar offset between consecutive blocks can be made uniformly unity. A uniformly single block offset is preferred by the inventors but two-block, three-block and other uniform or non-uniform columnar offsets may also be employed using the teachings disclosed herein to obtain similarly advantageous results.

Logical CKD track 28 is stored on array cylinder 30 according to the following procedure:

(a.) Start placing (the first) field C1 in block B1. If it overflows B1, continue placing it in block B2, and so forth. Finally, when field C1 is completely stored, leave any remaining space in the last block (Bi) empty.

(b.) Start storing the next CKD field D1 from the beginning of the next block B(i+1). Thus, all CKD fields begin on block boundaries in cylinder 30.

(c.) Repeat steps a and b and until all CKD record fields are stored.

(d.) In steps (a)–(c) above, skip all defective FBA blocks encountered.

It is readily appreciated upon examination of FIG. 4 that logical CKD track 28 is stored according to the above method. Count field C1 is stored in block B1 and, because count field C1 is less than 1KB, C1 does not extend into block B2. Accordingly, data field D1 begins in block B2 and extends for eight of the 1KB FBA blocks, through block B9. This process proceeds through block B26, which contains the last portion of the 4KB data field D4 from record R4.

The data stored in cylinder 30 of FIG. 4 can be accessed and retrieved by reading the entire logical track along the diagonal-major sequences, merely following the diagonal pattern while reading consecutive blocks. With this arrangement, only one of the four DASDs in the array is transferring data at any time. Thus, the effective data rate of the DASD array is equal to the data rate of any single DASD, which herein is denominated data transfer rate (D). Finally, in FIG. 4, once a block has been read or written from or to any DASD(i), the next block to be read or written on DASD(i) is at least three (N−1=3) blocks removed, which in this example provides sufficient time delay (micro-jog delay T) to micro-jog the head from read to write alignment. The operation of the above channel program example with microjog delay T is discussed in detail below.

Channel Program Example With Micro-Jog Delay

The following detailed example demonstrates how the above channel program operates with micro-jogging when updating record R4 in FIG. 4. The first step is the search for count field C4, which marks the beginning of record R4. The channel program usually specifies a sector number (not shown) that precedes the start of count field C4. Thus, the program could specify a sector number that maps to block B21, which is the last block of record R3. However, depending on the application, the channel program may specify a sector number that maps to an earlier block, such as B20 or before. That is, the channel program sector number may not always map to the sought count field.

Once the channel program provides a sector number, the next block number that contains a count field at or following the block mapped from the sector number must be identified. The method of this invention includes a pointer field (one byte or more as necessary) within every FBA block for holding a forward pointer that maps to the next count field. In addition, a few bits are reserved in each block to distinguish blocks containing count fields from blocks containing data or key fields. With these two additional fields within each block, the updating of record R4 proceeds as follows.

Assume that the sector number in the channel program maps to block B21, which is the last block of data field D3. The actual search must then begin at about block B17 so that sufficient intervening blocks are available to permit a microjog from read to write alignment if necessary. So DASD 1 reads block B17, DASD 2 reads block B18, DASD 3 reads block B19 and DASD 4 reads block B20, if necessary. If reading block B17 uncovers a forward pointer to sought count field C4, then the procedure is free to bypass reading blocks B18–B20. Alternatively, if reading block B17 does not uncover the location of sought count field C4, the procedure continues to the reading of block B18. If count field C4 is still unknown, it continues onward to blocks B19, B20 and so forth.

In the FIG. 4 example, after reading block B17, DASD 1 holds its head in the read alignment position to read block B21 because block B21 cannot be written; it is either a data field in which case it precedes data field D4 or is a count field, which must be read. This is known because block B21 maps from the channel program sector number (not shown) in this example. Also, block B17 contains a forward pointer to block B18, which is the next count field. Block B18 cannot be the count field C4 because it precedes the block (B21) that maps from the sector specified by the channel program. Accordingly, the location of count field C4 is still unknown after reading block B17 and DASD 1 remains in the read mode.

When DASD 2 reads block B18, the forward pointer indicates the next count field to be at block B22. This is the information sought by the procedure. Because block B22 must be read to recover count field C4, DASD 2 remains in the read mode (no micro-jog). However, DASDs 3, 4 and 1 may be immediately started on a microjog to their write mode head alignment because blocks B19, B20 and B21 may be bypassed. The search of count field C4 and the update of data field D4 can now be completed without lost revolutions arising from micro-jog delay (T) because DASD 2 will have a five block interval to micro-jog before writing block B26 and all other DASDs are preemptively micro-jogged at block B18.

Table 1 provides the general algorithm for a channel program with write intent. Nothing special is required for a channel program with read intent. The procedure in Table 1 exploits the reduced micro-jog time delay known for DASDs when switching from write to read alignment compared to the micro-jog time delay experienced when switching from read to write alignment. The method of this invention requires the write-to-read micro-jog to be performed in 1.9 block times plus one gap time (1.9B+G). This requirement arises in the worst case, where a block is read and the next count field is found to be only two blocks away. It cannot be merely one block away because there must be at least one data field between any two count fields. This situation is determinable immediately upon reading the first count field. If the FBA block size is 1KB, the count field is probably only 40 bytes or so. Thus, most of the count field block (perhaps 90%) plus a gap (G) plus the next block (B) is available to realign the head on the other DASDs from write to read alignment. This is possible in the DASD art. The reduced write-to-read micro-jog time delay is also advantageous when the search on a first count field is unsuccessful. The procedure then searches the next count field, which also may be as few as two blocks away, requiring a preemptively realigned DASD to micro-jog from write-to-read within (1.9B+G).

TABLE I

General Algorithm for a Channel Program With Write Intent

1. Let the sector number in channel program map to Block X. Let there be N disks in the array. Set B=X−N. Set all disks heads to read mode.
2. Read Block B;
3. If forward pointer in B≧X
   then do;
      determine disk C containing count field specified by pointer
      begin (R–>W) micro-jog of all disks except C
      exit step 3
   end;
4. B=B+1; If B=X then exit step 4; Read Block B;
5. If forward pointer B≧X
   then do;
      determine disk C containing count field specified by pointer
      begin (R–>W) micro-jog of all disks except C
      set disk C to read mode [either it already is, or it may be in
         middle of a (R–>W) micro-jog that must be interrupted.]
      exit step 5
   end;
   else begin (R–>W) micro-jog of disk containing B;
6. Return to Step 4.

Staggered Array Operation With Banded DASDs

CKD architecture requires a constant track capacity. Host software is written with this assumption. For example, allocation software in the host uses the track as the unit of allocation. Devices with multiple data bands have different track capacities in the different bands. Banding exploits the increased linear dimension of the tracks at the outer edge of a disk when compared to the inner tracks. Fig. 5 shows how the staggered array of this invention is used to accommodate banded DASDs. The fundamental approach is to present to the host a logical track image whose size is constant, as expected by CKD architecture.

In FIG. 5, a cylinder 32 having seven blocks per track and another cylinder 34 having eight blocks per track are shown as examples. Each cylinder includes one physical track from each of four DASDs in each of the two bands. A logical track size of 20 blocks is chosen for this example. Cylinder 32 includes a first logical track T1 having the five diagonal-major sequences S1–S5 and part of a second logical track T2 consisting of two such diagonal-major sequences S1–S2 for a total of 28 blocks. The remaining three diagonal-major sequences S3–S5 in logical track T2 are provided in cylinder 34 together with the sequences S1–S5 for a third logical track T3. Thus, the three logical tracks T1–T3 are distributed over two cylinders, for a total of 60 blocks.

The seek time on DASD 1 from the second sequence S2 of track T2 to the third sequence S3 of track T2 on a different cylinder can be overlapped in part with the time required to read or write blocks in the second sequence S2 of track T2 on DASDs 2, 3 and 4. That is, there are three (N−1=3) block times (3*B) available to perform a single track seek between bands, which should not take much longer than a micro-jog. The logical track size can be selected to accommodate various DASD array orders N and various combinations of physical track lengths within multiple bands.

Staggered Array Operation With Parity

Synchronous DASD arrays often employ parity techniques to recover from single DASD failures without interrupting system operation. Normally such a parity technique employs an additional DASD (N+1) for every N DASDs in an array. A single block on the $(N+1)^{th}$ parity DASD contains the parity of the data in a corresponding sequence of blocks on the remaining N DASDs in the array. When a DASD fails, data from the surviving DASDs and the parity DASD can be combined to recover the unavailable or missing data blocks using a simple hardware exclusive-OR procedure. Such systems often employ standby ("hot") DASDs that may be switched into the DASD array for immediate reconstitution of the data frozen in a failed DASD.

With a variation disclosed below, the staggered array of this invention permits the addition of a parity disk for fault-tolerance. FIG. 6 is identical to FIG. 4 except for the addition of a parity DASD 5, which completes a 5-DASD cylinder 36. Each parity block P1 through P8 contains the parity of a corresponding diagonal-major sequence of data blocks in the four remaining DASDs. For instance, parity block P1 contains the parity of diagonal-major sequence B1–B4, parity block P2 contains the parity of sequence B5–B8, and so forth.

Whenever a block in a sequence must be updated, all of the blocks in that sequence must be read to permit recalculation of the updated parity block corresponding to the updated sequence. This is possible by starting the update operation a few blocks earlier than otherwise necessary and continuing for a few blocks later than normally necessary. For example, consider an operation that searches field C2 (block B10) and updates fields K2 and D2 (blocks B11–B17). Instead of starting the operation at block B10, the operation is started by reading block B9. Then, block B10 is read and blocks B11–B12 are written. Because the values in blocks B9–B12 are now known, parity field P3 can be updated on DASD 5 simultaneously with the update of block B13, on DASD 1. The updating continues with blocks B14–B16, followed by the updating of parity field P4 simultaneously with the update of block B17. Without parity, the operation would end here. With parity, blocks B18 through B20 must be read to compute updated parity field P5. This simple example shows that the incorporation of parity in the staggered array of this invention may require beginning and ending each update operation a few blocks earlier or later than otherwise necessary.

Figure 7:
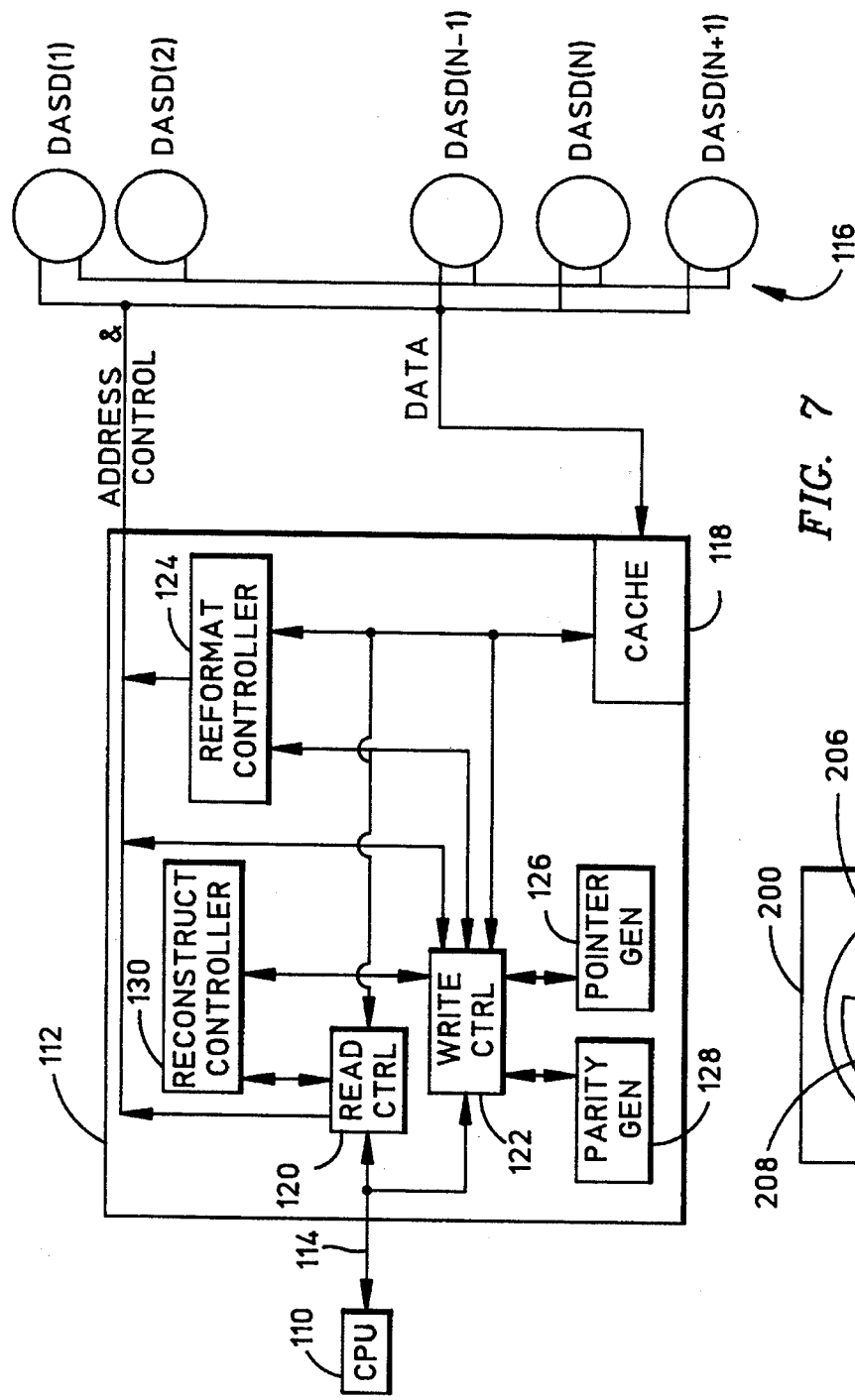
FIG. 7 provides a functional block diagram of an exemplary embodiment of the logical data storage system of this invention.

FIG. 7 shows a schematic block diagram of an exemplary embodiment of a logical data storage system according to this invention. The central processing unit (CPU) 110 accesses the DASD array 116 having a plurality of DASDs (1) through (N+1) over a path that includes the logical storage control system 112 and a channel 114. For the purposes of example only, system 112 is shown including a data cache 118 together with several program objects representing elements of the storage control system of this invention. For instance, system 112 may be embodied as a random access memory storing a plurality of program elements such as those shown. The program elements shown in system 112 include a read controller 120 coupled to DASD array 116 through cache 118. Read controller 120 is for retrieving each requested variable-length record in sequence responsive to a request therefor from CPU 110 by way of bus 114. System 112 also includes the write controller 122, which is coupled to DASD array 116 by way of cache 118, for synchronously writing variable length record blocks in a predetermined toroidal traverse having one or more diagonal-major sequences over several of the DASDs in array 116. The variable length records are reformatted by a reformat controller 124 coupled to write controller 122 according to the reformatting method of this invention. Write controller 1 is also coupled to a pointer generator 126 for adding to each count field a pointer representing the number of blocks separating the count fields in the variable length record. Similarly, a parity generatory 128 is coupled to write controller 122 to provide a corresponding parity block for storage with each diagonal-major sequence recorded in array 116. Finally, a reconstruction controller 130 is coupled to both the read controller 120 and write controller 122 for reconstructing data blocks that are not available in DASD array 116 because of the failure of one of the DASDs. Reconstruction is accomplished by using the stored parity information to reconstruct the unavailable data bits lost by the failure of a single DASD. Practitioners normally skilled in the an can understand that the program-object embodiment shown in FIG. 7 is one of many possible useful embodiments of the system of this invention.

Figure 8:
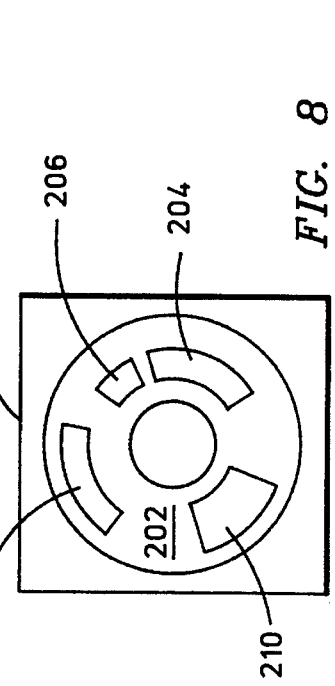
FIG. 8 shows a schematic diagram of a recorded floppy data disk exemplifying a computer program product produced in accordance with this invention.

While this invention is disclosed as a method, any person of ordinary skill in the art can understand that an apparatus, such as a conventional data processor including CPU 110, memory 118, input/output 114, program storage 112, and other appropriate components can be programmed or otherwise designed to facilitate the practice of the method of this invention. Such a processor may include the appropriate program means, such as those discussed above in connection with the system 112, for executing the method of this invention. Also, an article of manufacture such as the pre-recorded floppy disk 200 shown in FIG. 8 or other similar computer program product for use with a data processing system, may include a storage medium and program means recorded thereon for directing the data processing system of FIG. 7 to facilitate the practice of the method of this invention. For instance, disk 200 may include the magnetic memory means 202 on which are stored the program objects 204, 206, 208, and 210, each representing one or more of the program objects discussed above in connection with FIG. 7. Practitioners in the art can readily appreciate that such apparatus (FIG. 7) and articles of manufacture (FIG. 8) also fall within the spirit and scope of this invention.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A method of operating a logical data storage system for accessing variable length records in an array of N synchronized fixed block formatted Direct Access Storage Devices (DASDs), each said DASD having a plurality of physical tracks and a data transfer rate (D), each said variable length record having at least a count field and one data field, each said physical track having one or more blocks of size (B) separated by gaps of size (G), wherein N>1 is a positive integer, said method comprising the steps of:

(a) reformatting each said variable length record into a first said block representing said count field and one or more additional said blocks representing said at least one data field and all other fields;

(b) writing, on said physical tracks, said first block and said additional blocks of said each variable length record synchronously in a predetermined toroidal traverse having one or more diagonal-major sequences over at least some of said N DASDs such that the $j^{th}$ said block on the $i^{th}$ said physical track of the $k^{th}$ said DASD follows the $(j-g)^{th}$ said block on the $i^{th}$ said physical track of the $(k-1)^{th}$ said DASD, said diagonal-major sequences wrapping around from the $j^{th}$ said block on the $N^{th}$ said DASD to the $(j+h)^{th}$ said block on the first said DASD, wherein g, h, i, j, and k are non-zero positive integers;

(c) adding to each said count field a pointer representing the number of said blocks separating the first subsequent said count field from said each count field; and (d) accessing said blocks forming said requested variable length record in the sequence specified in said reformatting step (a) and said writing step (b) responsive to a request for at least one said variable length record, thereby retrieving said requested variable length record.

2. The method of claim 1 wherein said fixed block format is a NO-ID Fixed Block Access (FBA) format without separate block identification fields.

3. The method of claim 2 wherein said logical data storage system includes an array of (N+1) DASDs, said method comprising the additional steps of:

(bb) forming a corresponding parity block for each said diagonal-major sequence of no more than N said blocks concurrently with said writing step (b) and writing said corresponding parity block on the $(N+1)^{st}$ DASD; and (e) reconstructing one or more unavailable said blocks stored in a failed said DASD by combining the available said blocks in each said diagonal-major sequence with the corresponding said parity block in said $(N+1)^{st}$ DASD.

4. The method of claim 3 wherein each said DASD has read and write head-to-track alignments and a micro-jog time (T) delay between said read alignment and said write alignment in said each DASD, and wherein said DASD plurality N satisfies the inequality $N \leq (B+DT)/(B+G)$.

5. The method of claim 4 wherein said each DASD is organized into two or more concentric bands, each said band having a plurality of physical tracks with identical physical block storage capacity and wherein said first block and said additional blocks are organized in one or more logical tracks distributed in one or more diagonal-major sequences over at least some of said N DASDs.

6. The method of claim 2 wherein each said DASD has read and write head-to-track alignments and a micro-jog time (T) delay between said read alignment and said write alignment in said each DASD, and wherein said DASD plurality N satisfies the inequality $N \leq (B+DT)/(B+G)$.

7. The method of claim 2 wherein said each DASD is organized into two or more concentric bands, each said band having a plurality of physical tracks with identical physical block storage capacity and wherein said first block and said additional blocks are organized in one or more logical tracks distributed in one or more diagonal-major sequences over at least some of said N DASDs.

8. The method of claim 1 wherein said logical data storage system includes an array of (N+1) DASDs, said method comprising the additional steps of:

(bb) forming a corresponding parity block for each said diagonal-major sequence of no more than N said blocks concurrently with said writing step (b) and writing said corresponding parity block on the $(N+1)^{st}$ DASD; and (e) reconstructing one or more unavailable said blocks stored in a failed said DASD by combining the available said blocks in each said diagonal-major sequence with the corresponding said parity block in said $(N+1)^{st}$ DASD.

9. The method of claim 8 wherein each said DASD has read and write head-to-track alignments and a micro-jog time (T) delay between said read alignment and said write alignment in said each DASD, and wherein said DASD plurality N satisfies the inequality $N \leq (B+DT)/(B+G)$.

10. The method of claim 9 wherein said each DASD is organized into two or more concentric bands, each said band having a plurality of physical tracks with a physical block storage capacity and wherein said first block and said additional blocks are organized in one or more logical tracks of equal size distributed in one or more diagonal-major sequences over at least some of said N DASDs.

11. The method of claim 8 wherein said each DASD is organized into two or more concentric bands, each said band having a plurality of physical tracks with identical physical block storage capacity and wherein said first block and said additional blocks are organized in one or more logical tracks distributed in one or more diagonal-major sequences over at least some of said N DASDs.

12. The method of claim 1 wherein each said DASD has read and write head-to-track alignments and a micro-jog time (T) delay between said read alignment and said write alignment in said each DASD, and wherein said DASD plurality N satisfies the inequality $N \leq (B+DT)/(B+G)$.

13. The method of claim 1 wherein said each DASD is organized into two or more concentric bands, each said band having a plurality of physical tracks with identical physical block storage capacity and wherein said first block and said additional blocks are organized in one or more logical tracks distributed in one or more diagonal-major sequences over at least some of said N DASDs.

14. A logical data storage system for accessing variable length records each having at least a count field and one data field, said system comprising:

an array of N synchronized fixed block formatted Direct Access Storage Devices (DASDs), each said DASD having a plurality of physical tracks and a data transfer rate (D), each said physical track having one or more blocks of size (B) separated by gaps of size (G), wherein N>1 is a positive integer;

reformatting means coupled to said array for reformatting each said variable length record into a first said block representing said count field and one or more additional said blocks representing said at least one data field and all other fields;

writing means coupled to each said DASD and to said reformatting means for synchronously writing, on said physical tracks, said first block and said additional blocks of said each variable length record in a predetermined toroidal traverse having one or more diagonal-major sequences over at least some of said N DASDs such that the $j^{th}$ said block on the $i^{th}$ said physical track of the $k^{th}$ said DASD follows the $(j-g)^{th}$ said block on the $i^{th}$ said physical track of the $(k-1)^{th}$ said DASD, said diagonal-major sequences wrapping around from the $j^{th}$ said block on the $N^{th}$ said DASD to the $(j+h)^{th}$ said block on the first said DASD, wherein g, h, i, j, and k are non-zero positive integers;

pointer means coupled to said writing means for adding to each said count field a pointer representing the number of said blocks separating the first subsequent said count field from said each count field; and retrieving means coupled to said array for accessing said blocks forming a requested variable length record in sequence responsive to a request for at least one said variable length record.

15. The logical data storage system of claim 14 wherein said array includes (N+1) DASDs, said system further comprising:

parity means coupled to said writing means for forming a corresponding parity block for each said diagonal-major sequence of no more than N said blocks and for writing said corresponding parity block on the $(N+1)^{st}$ DASD; and reconstructing means coupled to said retrieving means for reconstructing one or more unavailable said blocks stored in a failed said DASD by combining the available said blocks in each said diagonal-major sequence with the corresponding said parity block in said $(N+1)^{st}$ DASD.

16. The logical data storage system of claim 15 wherein each said DASD has read and write head-to-track alignments and a micro-jog time (T) delay between said read alignment and said write alignment in said each DASD, and wherein said DASD plurality N satisfies the inequality $N \leq (B+DT)/(B+G)$.

17. The logical data storage system of claim 16 wherein said each DASD is organized into two or more concentric bands, each said band having a plurality of physical tracks with identical physical block storage capacity and wherein said first block and said additional blocks are organized in one or more logical tracks distributed in one or more diagonal-major sequences over at least some of said N DASDs.

18. The logical data storage system of claim 14 wherein each said DASD has read and write head-to-track alignments and a micro-jog time (T) delay between said read alignment and said write alignment in said each DASD, and wherein said DASD plurality N satisfies the inequality $N \leq (B+DT)/(B+G)$.

19. The logical data storage system of claim 18 wherein said each DASD is organized into two or more concentric bands, each said band having a plurality of physical tracks with identical physical block storage capacity and wherein said first block and said additional blocks are organized in one or more logical tracks distributed in one or more diagonal-major sequences over at least some of said N DASDs.

20. The logical data storage system of claim 14 wherein said fixed block format is a NO-ID Fixed Block Access (FBA) format without separate block identification fields.

21. The logical data storage system of claim 14 wherein said each DASD is organized into two or more concentric bands, each said band having a plurality of physical tracks with identical physical block storage capacity and wherein said first block and said additional blocks are organized in one or more logical tracks distributed in one or more diagonal-major sequences over at least some of said N DASDs.

22. A computer program product for use with a computer system having a central processing unit for accessing variable length records in a logical data storage system having an array of N synchronized fixed block formatted Direct Access Storage Devices (DASDs), each said DASD having a plurality of physical tracks and a data transfer rate (D), each said variable length record having at least a count field and one data field, each said physical track having one or more blocks of size (B) separated by gaps of size (G), wherein N>1 is a positive integer, said computer program product comprising:

a recording medium;

means recorded on said recording medium for directing said computer system to reformat each said variable length record into a first said block representing said count field and one or more additional said blocks representing said at least one data field and all other fields;

means recorded on said recording medium for directing said computer system to synchronously write, on said physical tracks, said first block and said additional blocks of said each variable length record in a predetermined toroidal traverse having one or more diagonal-major sequences over at least some of said N DASDs such that the $j^{th}$ said block on the $i^{th}$ said physical track of the $k^{th}$ said DASD follows the $(j-g)^{th}$ said block on the $i^{th}$ said physical track of the $(k-1)^{th}$ said DASD, said diagonal-major sequences wrapping around from the $j^{th}$ said block on the $N^{th}$ said DASD to the $(j+h)^{th}$ said block on the first said DASD, wherein g, h, i, j, and k are non-zero positive integers;

means recorded on said recording medium for directing said computer system to add to each said count field a pointer representing the number of said blocks separating the first subsequent said count field from said each count field; and means recorded on said recording medium for directing said computer system to access said blocks forming said requested variable length record in sequence responsive to a request for at least one said variable length record.

23. The computer program product of claim 22 wherein said array includes (N+1) DASDs, said computer program product further comprising:

means recorded on said recording medium for directing said computer system to form a corresponding parity block for each said diagonal-major sequence of no more than N said blocks and to write said corresponding parity block on the $(N+1)^{st}$ DASD; and means recorded on said recording medium for directing said computer system to reconstruct one or more unavailable said blocks stored in a failed said DASD by combining the available said blocks in each said diagonal-major sequence with the corresponding said parity block in said $(N+1)^{st}$ DASD.

24. The computer program product of claim 23 wherein each said DASD has read and write head-to-track alignments and a micro-jog time (T) delay between said read alignment and said write alignment in said each DASD, and wherein said DASD plurality N satisfies the inequality $N \leq (B+DT)/(B+G)$.

25. The computer program product of claim 24 wherein said each DASD is organized into two or more concentric bands, each said band having a plurality of physical tracks with identical physical block storage capacity and wherein said first block and said additional blocks are organized in one or more logical tracks distributed in one or more diagonal-major sequences over at least some of said N DASDs.

26. The computer program product of claim 22 wherein each said DASD has read and write head-to-track alignments and a micro-jog time (T) delay between said read alignment and said write alignment in said each DASD, and wherein said DASD plurality N satisfies the inequality $N \leq (B+DT)/(B+G)$.

27. The computer program product of claim 26 wherein said each DASD is organized into two or more concentric bands, each said band having a plurality of physical tracks with identical physical block storage capacity and wherein said first block and said additional blocks are organized in one or more logical tracks distributed in one or more diagonal-major sequences over at least some of said N DASDs.

28. The computer program product of claim 22 wherein said fixed block format is a NO-ID Fixed Block Access (FBA) format without separate block identification fields.

29. The computer program product of claim 22 wherein said each DASD is organized into two or more concentric bands, each said band having a plurality of physical tracks with identical physical block storage capacity and wherein said first block and said additional blocks are organized in one or more logical tracks distributed in one or more diagonal-major sequences over at least some of said N DASDs.

* * * * *